3,346,517
POLYURETHANES FORMED FROM FATTY
AMINE POLYOLS
Marwan R. Kamal, Minneapolis, Minn., assignor to
General Mills, Inc., a corporation of Delaware
No Drawing. Filed Dec. 23, 1963, Ser. No. 332,928
8 Claims. (Cl. 260—2.5)

ABSTRACT OF THE DISCLOSURE

The instant invention relates to a new polyol compound, and to new polyurethane producing methods, compositions and the resulting products, including foams and films thereof, using known organic polyisocyanates in combination with such new polyols having the formula:

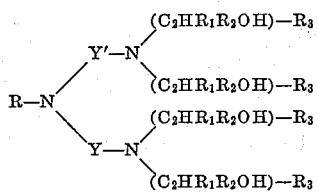

wherein R is an aliphatic $C_8$–$C_{22}$ fatty hydrocarbon chain, Y and Y' are each $C_3$–$C_4$ alkylene groups, $R_1$ and $R_2$ are each selected from the group consisting of H and $C_1$–$C_4$ alkyl groups, $R_1$ and $R_2$ being attached to different C's with the parentheses containing the same in said formula, and $R_3$ is selected from the group consisting of H, alkaryl, aryl, aralkyl and aryloxy groups.

---

Foamed polyurethane resins are well known in the synthetic resin industry. These materials may be either flexible or rigid foams, and they are formed generally by the reaction of a polyisocyanate with a hydroxy-radical containing compound, generally referred to as a polyol compound. The most commonly used polyisocyanate is an aromatic diisocyanate, e.g., tolylene diisocyanate, sometimes referred to as toluene diisocyanate, but many other organic polyisocyanates are also known and used. A variety of polyol compounds have been suggested for use in the reaction with the aforesaid organic polyisocyanates to produce suitable polyurethane polymers; and the instant invention relates to a new polyol compound, the method of producing the same, and methods of using the same in the production of new and improved polyurethane foams.

In the preparation of foamed polyurethanes, the polyisocyanate is caused to react with the hydroxyl group-containing polyol (with or without numerous conventional catalysts) while foaming of the composition is carried out simultaneously, and the resulting product may vary from a flexible to a rigid foam, depending upon the materials, concentrations, reaction conditions, etc. used.

Numerous polyurethane foaming agents are also known and used in the industry. Some of these are volatile materials which volatilize under controlled conditions of polyurethane formation to produce the desired foam cell size and character. Others generate gas during foam forming process. For example, polyurethane formation in the presence of water, results in a reaction between the water and a small amount of the polyisocyanate to reduce carbon dioxide gas for foaming purposes. Procedures for preparing a foamed or cellular type of polyurethane resin are described in numerous prior art publications, which include Parker U.S. Patent No. 2,911,379, Bick U.S. Patent No. 2,938,005 and Moller U.S. Patent No. 2,941,967.

Although the instant invention does not preclude the incorporation of various powdered materials therein or other inert ingredients, during the preparation of the polyurethane foam, it will be appreciated that the polyurethane resin foaming components consist essentially of the novel polyol of the instant invention plus any one or more of a number of known and conventional polyisocyanates used for the purpose of producing polyurethane foams.

It is, therefore, an important object of the instant invention to provide a new polyol compound, a new method of producing the same, new compositions and methods for the production of polyurethane resins, and new polyurethane foams of controlled cell size and other advantageous features resulting from the practice of the instant invention.

Other and further objects, features and advantages of the present invention will become apparent to those skilled in the art from the following detailed disclosure thereof and the examples hereof.

An initial aspect of the instant invention consists in a process of producing a new polyol which comprises condensing (a) aliphatic mono-tertiary di-primary amine having the formula:

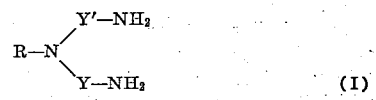

wherein R is an aliphatic $C_8$–$C_{22}$ fatty hydrocarbon chain and Y and Y' are each $C_3$–$C_4$ alkylene groups, with (b) a mono-epoxy compound, in a ratio of substantially one mol of (b) for each primary amino H in (a).

One of the starting materials employed in producing the new polyol of the instant invention is an amine, often designated (a), which has the following structural formula:

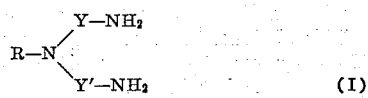

wherein R is an aliphatic $C_8$–$C_{22}$ fatty hydrocarbon chain and Y and Y' are each $C_3$–$C_4$ alkylene groups. Preferably R is a $C_{12}$–$C_{22}$ aliphatic hydrocarbon group. In general, the R group may be octyl, nonyl, decyl, undecyl, etc. but preferably R will be derived from the naturally occurring fatty acids such as oleic, lauric, linoleic, and the like, or mixtures thereof found in the fatty oils such as tallow oil, coconut oil, and the like. Where R is derived from a mixture of acids, such as tallow oil, coconut oil, and the like; R is defined in the usual manner by the source of the acids, such as tallow, coco, etc.

These compounds may be prepared in the conventional manner by a two-step process consisting of the preparation of the diadduct of acrylonitrile (and/or substituted acrylonitriles such as methacrylonitrile and crotonic nitrile) with a primary aliphatic amine in which the aliphatic group has from 8 to 22 carbon atoms followed by subsequent hydrogenation of the dinitrile product to the amine product.

The principal means of preparing the diadducts of acrylonitrile and the primary aliphatic amines consists in reacting an excess of acrylonitrile (two to ten times the theoretical amount) with the aliphatic amine in the presence of an acid catalyst within the temperature range of 60–100° C. In general, the relatively strong acids, such as acetic acid and phosphoric acid, are used in the dicyanoethylation process. In addition to the acidic catalysts, other non-acid catalysts may also be employed. The time of reaction depends largely on the particular catalysts used and the proportions thereof. In general, the time of reaction will be from seven to forty hours.

The polyamines of this invention are then obtained by the hydrogenation of the dinitriles. Any conventional hydrogenation technique may be employed which will reduce the nitrile groups. In general, the reduction is carried out in the presence of a catalyst, such as palladium or nickel, and in the presence of ammonia under super-atmospheric conditions and at temperatures less than 100° C., in the range of 70–100° C., under pressure of hydrogen on the order of 700 to 1500 pounds per square inch gage. In general, about two mols of ammonia per mol of tertiary amine is employed. When using wet Raney nickel as a catalyst, the catalyst is used generally in an amount of about 10% by weight based on the amount of dinitrile.

The preparation of the acrylonitrile diadduct can best be illustrated by means of the following procedure:

Ten equivalents of commercial distilled dodecyl amine (1970 grams), methanol (197 grams), 27 equivalents of acrylonitrile (1448 grams) and glacial acetic acid (39.4 grams) was stirred and heated under reflux for two and one-half hours. The stirrer was then stopped and the reaction allowed to stand at 47° C. for a total of 40 hours. The excess acrylonitrile, methanol and possibly some acetic acid were removed by heating the reaction product to 105° under a vacuum of 25 mm. The yield was 2990 grams (theory=3030 grams). As the diadduct is the tertiary amine present in the reaction mixture, the percent of diadduct present was determined by direct titration of the tertiary nitrogen atom. The tertiary amine content was 86%.

In a similar manner, the acrylonitrile diadduct, methacrylonitrile and/or crotonic nitrile may be formed from tallow amine, oleyl amine and similar fatty amines in which the fatty radical preferably contains from 12 to 22 carbon atoms.

The acrylonitrile diadduct of fatty amine (or any of the other foregoing nitrile adducts) can then be hydrogenated as illustrated by means of the following procedure:

The following were charged to a one liter magnetically-stirred hydrogenation pressure vessel:

(1) 400 grams of an acrylonitrile diadduct of distilled tallow amine prepared by the procedure just described. This diadduct had a tertiary amine content of 92%.
(2) 40 grams of wet Raney nickel catalyst (50% water).
(3) 10 mls. of methanol.
(4) 40 grams of ammonia.

The sealed vessel was pressurized with hydrogen to 1100 p.s.i. and then heated up to 90° C. while the contents were magnetically stirred for a total time of 5 hours. At this time the hydrogen consumption was down to zero. The vessel was cooled and vented. The contents were filtered warm to remove the catalyst. The yield of product was approximately 400 grams of a clear light-brown liquid that analyzed 90% tertiary amine and did not contain any nitrile groups as determined by the infrared spectra.

In a similar manner other monotertiary-diprimary amines have been prepared from various fatty amines. These are listed in the following table:

Table I.—Monotertiary-Diprimary Amines

| | Percent Tertiary Amine | Percent Nitrile |
|---|---|---|
| Prepared From— | | |
| Dodecyl amine | 90.2 | 0 |
| Coco amine | 84.3 | 0 |
| Hydrogenated tallow amine | 84.5 | 0 |
| Tallow amine | 86.0 | 0 |
| Oleyl amine | 93.0 | 0 |

The second reactant, herein designated (b), which is used to produce the instant polyol is a monoepoxy compound. It will be appreciated that such monoepoxy compound (b) is reacted with the previously described polyamino compound (a) preferably in a mol ratio at least sufficient to react one mole of the monoepoxy compound (b) with each primary amino hydrogen in the molecule of the polyamine (a). Preferably the monoepoxy compound (b) has the following formula:

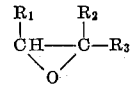

wherein $R_1$ and $R_2$ are each selected from the group consisting of H and $C_1$–$C_4$ alkyl and $R_3$ is selected from the group consisting of H, alkaryl, aralkyl, aryl and aryloxy groups. $R_3$ may thus be benzyl, tolyl, phenyl or phenoxy; and preferably the molar ratio of the monoepoxy compound (b) to the diprimary amine (a), is at least substantially 4 to 1, for producing the polyol of the invention, sometimes designated herein as (1) or the polyol (1). The structural formula of the polyol (1) of the instant invention may thus be represented as follows:

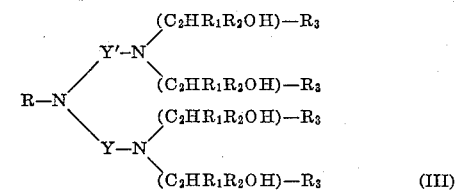

Preferably the monoepoxy compound (b) used in the practice of the instant invention is propylene oxide and using 4 mols of the same with 1 mol of N,N-bis-(3-aminopropyl) lauryl amine, as compound (a), one obtains a reaction which may be represented by the following Equation A:

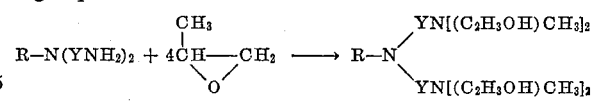

wherein R is lauryl and Y is propylene. Since the epoxy addition or condensation may result in either of the following possibilities:

(A′) 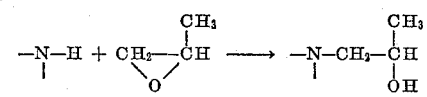

or (A″) 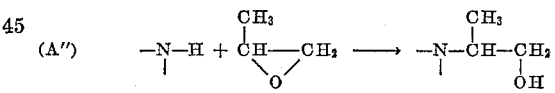

and, although reaction (A′) is understood to predominate, the group connected to the primary N is designated as —($C_2H_3OH$)—$CH_3$ for convenience. Thus, in the case of the monoepoxy compound (b) having the preferred formula:

the resulting group attached to the primary N is designated —($C_2HR_1R_2OH$)—$R_3$. It will be appreciated that other monoepoxy compounds such as ethylene oxide, butylene oxide, etc., up to and including $C_4$–$C_{10}$ alkylene oxides may be used. Other typical monoepoxy aromatic compounds which may be used include styrene oxide:

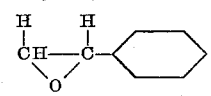

alpha-methyl styrene oxide:

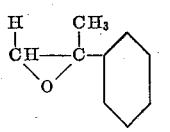

o-, m- or p-methyl styrene oxides, and related compounds:

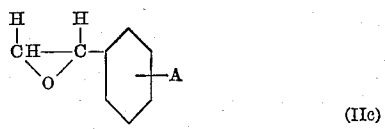

(IIc)

wherein A signifies methyl, or typically inert lower ($C_1$–$C_4$) alkyl or alkoxyl group; or compounds wherein the epoxy group and the aromatic nucleus are connected by typically inert ($C_1$–$C_4$) alkylene or alkylenoxy groups as in alpha-phenyl propylene oxide:

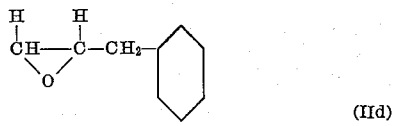

(IId)

or in phenyl glycidyl ether

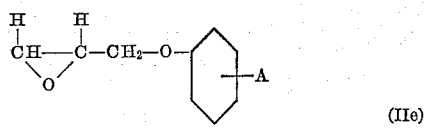

(IIe)

wherein A=H, but A may have the significance previously mentioned.

The reaction of compounds (a) and (b) to produce the polyol compound (1) is carried out under what are essentially conventional conditions for epoxide reaction or condensation with amines, which reactions are indicated in the aforesaid Equations A' and A" and which are essentially conventional and known reactions as such, with conventional and known reaction conditions therefor. Generally the reactants (a) and (b) are brought together slowly under controlled conditions in the absence of reactive ingredients (generally in an inert atmosphere) and moderate heating is permitted. An alkaline catalyst may be used but in the case of the use of an amine (as is here used) the alkaline catalyst is not necessary.

EXAMPLE 1

Preparation of the tetrakis-(2-hydroxypropyl) derivative of N,N-bis-(3-aminopropyl) lauryl amine.

In a three-necked flask equipped with stirrer, Dry-Ice reflux condenser, thermometer, dropping funnel, and inlet for dry nitrogen gas, was placed 164 g. (2.0 equivalents) of N,N-bis-(3-aminopropyl) lauryl amine, primary amine number 325.6, secondary amine number 32.5, tertiary amine number 175.4. The flask was flushed with dry nitrogen and the amine was heated to 110° C. Then 128 g. (2.2 equivalents) of propylene oxide was added from the dropping funnel at such a rate that only a slight reflux occurred in the condenser while maintaining a pot temperature of 100–110° C. Five hours were required for the addition. The temperature was then increased to 140° at which temperature essentially no more reflux occurred. The product was then stripped of any unreacted propylene oxide by heating to 100° C. in a vacuum. The weight of the final product corresponded to an uptake of 117 g., or 2.02 equivalents, of propylene oxide. The final product had the following properties: amine number 314, tertiary amine number 308, hydroxyl number 402, Gardner-Holdt viscosity Z3+.

EXAMPLE 2

Preparation of the tetrakis-(2-hydroxypropyl) derivative of N,N-bis-(3-aminopropyl) tallow amine.

In a process similar to that of Example 1, 175 g. (1.8 equivalents) of N,N-bis-(3-aminopropyl) tallow amine, primary amine number 275.5, secondary amine number 26.2, tertiary amine number 135.7 was reacted with 115 g. (2.0 equivalents) of propylene oxide. The weight of the final product corresponded to an uptake of 101 g., or 1.74 equivalents, of propylene oxide. The final product had the following properties: amine number 262, tertiary amine number 264, hydroxyl number 363, Gardner-Holdt viscosity Z1+.

The reaction of Example 1 is repeated using the same number of equivalents of a 50–50 mixture of ethylene and propylene oxide and a corresponding polyol is obtained. Using the same monoepoxy mixture in Example 2, a polyol is obtained by carrying out the procedure described in Example 2. Also, the propylene oxide in Examples 1 and 2 may be replaced completely by an equivalent amount of ethylene oxide in order to produce a polyol adduct of the invention, if excessive amounts of ethylene oxide are used, particularly, it will be found that an ethylene oxide or ethoxide chain may be produced in which there will be a polymeric series of ethoxide groups, but using substantially 1 mol of ethylene or propylene oxide for each primary amino hydrogen, the polymeric ethoxide or propoxide chain formation is nominal or minimized in the instant adduct, and if greater amounts of either of these compounds are used, a polyol still results, because the end of such ethoxide or propoxide chain will still have a terminal hydroxy group.

In addition, the various other $C_2$–$C_{10}$ alkylene epoxides may be used in the practice of the invention alone or in combination with simpler preferred epoxide such as propylene oxide. Aromatic epoxides such as the previously described styrene oxide, or any of the compounds previously indicated as (IIa) through (IIe), may also be used alone or in combinations, but as previously indicated the use of the simpler low moleculer weight $C_2$–$C_4$ alkylene oxides are preferred. In any event, the products obtained have a controlled number of hydroxy groups in a controlled chemical structure in the polyol (1).

The organic polyisocyanate, designated (2), may be any of the conventional organic polyisocyanates that are employed in the production of foamed polyurethane resins.

Although the toluene diisocyanates are preferred as the polyisocyanate used, any suitable polyisocyanate may be utilized in the process of the invention. Examples of the commonly employed polyisocyanates include tetramethylene diisocyanate, hexamethylene diisocyanate, the phenylene diisocyanates, the toluene diisocyanates, 1,5-naphthylene diisocyanate, p,p'-isocyanato diphenylmethane, p,p'-diisocyanato diphenyl dimethylmethane and 1,4-diisocyanato cyclohexane. The preferred group of polyisocyanates are the aromatic polyisocyanates. Commercial forms of (b) are designated "CB–75," "MR," and "N–80," which are also preferred for use in the practice of the invention and are defined more specifically in the list of definitions hereinafter given.

The ratio of polyol (1) to polyisocyanate (2) may be varied widely, as taught in the prior art, but it is customary to employ the polyisocyanate component in an amount usually in excess over that required to react with the hydroxyl groups contained in the polyol compound, but this is not absolutely necessary. Thus for 100 parts of the instant polyol (1), one may use about 25 parts to as much as about 100 parts of the polyisocyanate (2). In general, the ratio of (1):(2) ranges substantially from 1:5 to 5:1 in the practice of the invention. (As used herein, the terms "parts" mean parts by weight, unless otherwise designated; and the term "percent" will ordinarily refer to volume percent and will be so designated.)

For purposes of simplifying the subsequent discussion of the invention, the following definitions are here given:

*Definitions*

"CB–75" (Mondur CB–75): 75% Cellosolve acetate solution of a toluene diisocyanate trimethylolpropane prepolymer (Mobay Chemical Co.).

"MR" (Mondur MR): Crude diphenylmethane diisocyanate (Mobay Chemical Co.).

"N-80" (Nacconate 80): A mixture of 80% 2,4-toluene diisocyanate and 20% 2,6-toluene diisocyanate (National Aniline Division, Allied Chemical Co.).

"LK-380" (Niax triol LK-380): Polyether made from propylene oxide and an aromatic initiator (Union Carbide Chemical Co.).

"Polyol 152" (Wyandotte Experimental Polyol No. 152): Polyether from propylene oxide and methyl glucoside.

"L-520" (Silicone L-520): Union Carbide product (understood to be conventional polyurethane foam stabilizer having siloxane formulation typical of dimethyl siloxane oils).

"LA-475" ("Niax" Polyol LA-475): A hydroxypropylated derivative of diethylene triamine, with equivalent weight of approximately 115.

"Pleogen 4052": Polyether from propylene oxide and sucrose. Mol-Rez Division of American Petrochemical Corp.

"Freon 11-B": Trichlorofluoromethane (Du Pont).

"Pleogen 4020B": An isocyanate prepolymer (eq. wt. 140), Mol-Rez Division of American Petrochemical Corp.

"EDP-560" ("Pluracol" EDP-560): A hydroxypropylated derivative of ethylene diamine, with equivalent weight of approximately 125.

"$C_{18}$": The product of previous Example 2.
"$C_{12}$": The product of previous Example 1.

Methods (1) *Compressive strength.*—Compressive strength of rigid cellular plastics—ASTM Designation: D1621–59T.

(2) *Tensile strength.*—Tensile properties of rigid cellular plastics—ASTM Designation: D1623–59T.

(3) *Mandrel test.*—Test similar to simple mandrel test in Gardner and Sward's manual on Physical and Chemical Examination Paints-Varnishes-Lacquers-Colors, 12th ed., page 140.

(4) *G.E. impact flexibility test.*—Ibid. p. 147.

In carrying out the subsequent examples the foregoing definitions are used in many instances. The general procedure employed involves blending all of the ingredients together (which are listed in the tables of the various examples) except the polyisocyanate so as to form a premix and then stirring the premix rapidly with the polyisocyanate and pouring the same into a container. Initiation time and rise time are measured from the beginning of the final stirring of the premix with the polyisocyanate; and initiation time refers to the start of foaming and rise time refers to the time required for the foam to reach its maximum height.

EXAMPLE 3

This example illustrates the extreme rapidity of foams made from the products of this invention, as compared to previously available products. All ingredients in this example were at room temperature (75–80° F.).

| Amine Polyol, type | $C_{18}$ | $C_{12}$ | LA-475 | EDP-500 |
|---|---|---|---|---|
| Amine Polyol, parts | 50.0 | 50.0 | 70.0 | 70.0 |
| Silicone (L-520), parts | 0.5 | 0.5 | 0.7 | 0.7 |
| Freon 11B, parts | 18.0 | 19.0 | 28.0 | 27.3 |
| Mondur MR, parts | 50.0 | 56.0 | 85.4 | 81.9 |
| Initiation Time, sec | 0 | 4 | 15 | 24 |
| Rise time, sec | (¹) | (²) | 45 | 75 |

¹ Foaming began before mixing was started, and continued so rapidly that proper mixing and pouring could not be accomplished.
² Foaming began after only 4 sec. of mixing, and continued so rapidly that proper mixing and pouring could not be accomplished.

EXAMPLE 4

In the foams of this example, the premixes were cooled to 32° F. before mixing with the Mondur MR, which was at room temperature.

| Amine polyol, type | $C_{12}$ | LA-475 | EDP-500 |
|---|---|---|---|
| Amine polyol, parts | 70.0 | 70.0 | 70.0 |
| Silicone (L-520), parts | 0.7 | 0.7 | 0.7 |
| Dibutyl tin dilaurate, parts | 0.07 | 0.07 | 0.07 |
| Freon 11B, parts | 25.4 | 28.2 | 27.5 |
| Mondur MR, parts | 67.3 | 84.8 | 81.3 |
| Initiation time, sec | 12 | 32 | 45 |
| Rise time, sec | 45 | 55 | 90 |

EXAMPLE 5

In this example, the premixes were cooled to 25° F. and the Mondur MR was cooled to 32° F. before mixing. This and the preceding example show that even at low temperatures the products of this invention promote rapid foaming.

| Amine polyol, type | $C_{12}$ | LA-475 |
|---|---|---|
| Amine polyol, parts | 70.0 | 70.0 |
| Silicone (L-520), parts | 0.7 | 0.7 |
| Dibutyl tin dilaurate, parts | 0.07 | 0.07 |
| Freon 11B, parts | 25.2 | 28.0 |
| Mondur MR, parts | 70.0 | 85.3 |
| Initiation time, sec | 16 | 45 |
| Rise time, sec | 55 | 105 |

EXAMPLE 6

In this example, the amine-polyols were blended with an equal weight of one or the other of two commercial non-amine polyethers: Polyol 152 (Wyandotte Chemical Co.), equivalent weight 130; and "Pleogen" 4052 (American Petrochemical Corp.), equivalent weight 128. All ingredients were at room temperature. The data show that even in blends, the products of this invention result in much faster foams than obtainable from typical amine-polyols previously available.

| Amine polyol, type | $C_{18}$ | C | LA-475 | $C_{12}$ | LA-475 |
|---|---|---|---|---|---|
| Amine polyol, parts | 25.0 | 35.0 | 35.0 | 35.0 | 35.0 |
| Polyol 152, parts | 25.0 | 35.0 | 35.0 | | |
| Pleogen 4052, parts | | | | 35.0 | 35.0 |
| Silicone (L-520), parts | 0.5 | 0.7 | 0.7 | 0.7 | 0.7 |
| Freon 11B, parts | 19.0 | 25.9 | 27.3 | 25.9 | 27.3 |
| Mondur MR, parts | 54.0 | 72.8 | 80.5 | 73.5 | 81.2 |
| Initiation time, sec | 8 | 10 | 33 | 12 | 30 |
| Rise time, sec | 45 | 55 | 110 | 55 | 90 |

EXAMPLE 7

The following example shows some of the physical properties of foam made from one of the products of this invention. The ingredients of the foam were cooled to about 25° F. before the final mixing.

| | |
|---|---|
| Amine polyol, type | $C_{12}$ |
| Amine polyol, parts | 70.0 |
| Silicone (L-520), parts | 0.7 |
| Dibutyl tin dilaurate, parts | 0.3 |
| Freon 11B, parts | 27.3 |
| Mondur MR, parts | 78.0 |
| Initiation time, sec. | 11 |
| Rise time, sec. | 40 |
| Density, lb./cu. ft. | 2.3 |
| Compressive strength: | |
|     Parallel p.s.i. | 14.1 |
|     Perpendicular p.s.i. | 7.4 |
| Compressive modulus: | |
|     Parallel p.s.i. | 310 |
|     Perpendicular p.s.i. | 115 |

It will be appreciated that the tertiary amino groups in the polyol (1) of the instant invention provide a catalytic effect that is particularly important for the polyurethane formation and this makes the instant polyol compounds highly reactive with the polyisocyanates (2) and provides for much faster coatings and foams. The properties are thus exceedingly advantageous for the use of controlled foaming conditions, particularly requiring fast reactivity and fast curing, e.g., in formulations of spray coatings and spray foams. It will be appreciated that it has been demonstrated that the instant polyol compounds (1) may be incorporated with less reactive polyol systems of a comparable nature so as to substantially accelerate their curing and/or foaming. Coatings can be formulated which are tack-free in less than three minutes and provide excellent solvent resistance, impact resistance, tensile hardness and flexibility. In addition, most of the properties are retained at very low temperatures, e.g. −10° C.

The foams have been prepared in the practice of the instant invention exhibiting excellent rigidity, high tensile strength, and good shrinkage properties, such that they are equal to or better than most commercially available systems with respect to these physical properties.

EXAMPLE 8

Clear coatings are obtained based on the polyol obtained in the previous Example 2 as follows:

A polyurethane coating system is made from 7.4 grams of the polyol (1) of Example 2 and 22 grams of Mondur "CB-75" dissolved in 19.3 grams of a 50-50 by weight mixture of Cellosolve acetate and xylene; and coatings of 3 mils thickness are applied to tin and glass panels. Such coatings are found to have the following properties:

| | |
|---|---|
| Tack-free time at room temperature _____min__ | 12 |
| Gel time _____hr__ | ½–1 |
| Pencil hardness after 5 hours at room temperature | B |
| Pencil hardness after 24 hours at room temperature | B |
| Rocker hardness after 24 hours at room temperature _____percent__ | 44 |

EXAMPLE 9

Orange pigmented coatings based upon the tallow polyol of Example 2 may also be prepared as follows: 16 grams of molybdate orange, 8 grams of the tallow polyol obtained in Example 2, 14 grams of methyl ethyl ketone, 14 grams of xylene and 8 grams of 10% solution of cellulose acetate butyrate in equal parts of Cellosolve acetate and toluene are ground and thoroughly mixed in a ball mill and by shaking the mixture in a paint conditioner for 15 minutes. Then a charge of 5.2 grams of previously defined "N-80" polyisocyanate is added to the above components and the resulting mixture is applied in 3 mils thicknesses to glass, tin and steel panels. The following properties of the coatings are observed:

| | |
|---|---|
| Tack-free time at room temperature _____min__ | 7 |
| Gel time _____min__ | 40 |
| Pencil hardness after 3 days at room temperature __ | HB |
| Rocker hardness after 7 days at room temperature _____percent__ | 40 |

EXAMPLE 10

A foam is prepared by premixing 14.8 grams of the polyol product of Example 2, 14.8 grams of previously defined "LK-380," 11.5 grams of Freon 11B, 0.4 gram of Silicone L-520, and into this is thoroughly mixed a charge of 29 grams of previously defined "MR" polyisocyanate, using a high speed stirrer; and the resulting mixture is then poured into a 5 pound paper bag. The foam rises nicely in the bag and a resulting rigid foam becomes tack-free in 2 minutes and has the following physical properties after curing at 65° C. for 24 hours:

| | |
|---|---|
| Density _____p.c.f__ | 2 |
| Compressive strength: | |
|     Parallel _____p.s.i__ | 31 |
|     Perpendicular _____p.s.i__ | 20 |
| Tensile strength: | |
|     Parallel _____p.s.i__ | 56 |
|     Perpendicular _____p.s.i__ | 42 |
| Closed cells _____percent__ | 91 |

EXAMPLE 11

A charge of 14.5 grams of the polyol obtained in previously described Example 1, 32 grams of previously defined "polyol No. 152," 0.4 gram of previously defined "L-520," 14 grams of Freon 11B and 53.4 grams of previously defined "MR" polyisocyanate were thoroughly mixed together and allowed to form substantially as described in the previous example. The foam becomes tack-free in 1 minute and after curing at 100° C. for one hour has the following properties:

| | |
|---|---|
| Density _____p.c.f__ | 2.3 |
| Compressive strength: | |
|     Parallel _____p.s.i__ | 35 |
|     Perpendicular _____p.s.i__ | 17 |
| Tensile strength: | |
|     Parallel _____p.s.i__ | 78 |
|     Perpendicular _____p.s.i__ | 50 |

It will be appreciated that the foregoing procedures may be employed using any of the other polyol compounds hereinbefore described in equivalent proportions, and it will further be appreciated that the polyurethane foams and/or films may be obtained using variations in reaction temperatures, with other solvents or without any solvents, and under other known or conventional reaction conditions.

Coating formulations may be prepared exhibiting various properties by varying the isocyanate to hydroxy ratio (i.e., the NCO/OH ratio). Coatings giving the best properties, however, have NCO/OH ratios of 1 to 1.1 or 1.2 to 1. As indicated previously, pigments, stabilizing agents and the like may be included in these formulations in conventional function, but it will further be noted that the polyurethane foaming components are the hereinbefore defined components (1) and (2), although the polyol (1) may be replaced up to about as much as 75% in special instances. Thus, the polyol ingredient which may be used in the practice of the instant invention comprises from 25 to 100% of the previously defined polyol (1), with the remainder consisting essentially of conventional polyol materials of the prior art, which are defined generally in the prior art and by the skilled workers as selected from the class consisting of polyesters and polyethers containing a plurality of "active hydrogen" groups, i.e. hydroxyl groups which are reactive with the isocyanate groups to produce suitable polyurethane polymers. It will be appreciated that in the foregoing examples, reference is also made to short chain (i.e. ethylene) polyamines which have been reacted to produce polyols, so the polyols that may be used in combination with the new substance, the polyol (1), in the practice of the instant invention for the production of polyurethane resins actually include any of the commercially available polyhydroxy compounds wherein the hydroxy groups are connected to molecules of polyesters, polyethers, or polyamines (of short chain alkylene groups as contrasted to the polyamines (a) used in the practice of the instant invention).

*Theory of invention*

Although it is not desired to limit the invention to any particular theory, a theoretical consideration thereof may be helpful. Heretofore the common polyols used in polyurethane formation included certain "generally" di-ols or substantially "di-ols" which resulted from polyester formation between poly basic acids and polyhydric alcohols, which polyesters would ordinarily be linear in character and would have terminal hydroxy groups on each molecule, hence the di-ol. If the polyhydric alcohol included a triol such as glycerine, then these polyesters would average more than 2 hydroxy groups per molecule; but in any case the linkages between the acid groups would be either short chain aliphatic (e.g. $C_2$–$C_6$ alkylene groups) or they would be low molecular weight aryl groups as is the case of phthalic anhydride as the starting material. The hydrocarbon chain in the alcohol starting material would also be relatively short chain being for example usually $C_2$–$C_3$ groups as in ethylene glycol and glycerol. These polyesters were not necessarily limited to such extremely short or low molecular weight carbon chains or groups between the ester linkages, but this is generally the case and recently it has been found that the polyesters are generally less satisfactory for polyurethane formation.

Another class of common polyol used in the preparation of polyurethanes involves the simple polyethylene glycols or polyglycols generally, which might be referred to as the polyalkylene glycols or merely alkoxylated polyalcohols, wherein a starting material such as ethylene glycol or glycerol is ethoxylated with a plurality of, for example, ethylene oxide groups so as to obtain a polyethoxide chain prior to the terminal OH group. Here again, the hydrocarbon portions of the molecule are relatively short chain or low molecular weight, inbetween the plurality of ether linkages, but as in the case of the aforesaid polyester, the compounds generally terminated at least with OH groups so that they were di-ols, at least. And in the case of condensates or adducts of alkylene oxide and polyol starting materials such as sucrose and the like, it will be appreciated that the resulting polyols are still polyethers but they contain more than two hydroxy groups per moecular unit. The foregoing have been compared generally with the present materials and found to be distinctly slow in reaction and otherwise different in performance from the polyols (1) of the invention, but as previously mentioned, the polyols (1) of the invention may be combined with these various prior art polyester or polyether polyols to obtain controlled polyurethane formation, whereby the polyols (1) of the invention may be replaced by up to 75% of their weight with prior art polyester and/or polyether polyols used in polyurethane production.

It has also been found that certain prior art polyols obtained from certain polyamines may be used, as indicated in the previous paragraph, as the substitute for the known prior art polyester and/or polyether polyols. These materials, however, have the characteristic of being formed from polyamines wherein the amine linkages are connected by comparatively short chain alkylene linkages, as in the case of "LA–475" which is formed from diethylene triamine and "EDP–500" which is formed from ethylene diamine. Even assuming that all of the hydrogens attached to amino groups in the starting materials for these two polyamine polyols commercially available are reacted, it will be seen that the following polyols would appear to be obtained:

"EDP–500"

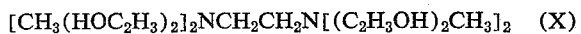

$[CH_3(HOC_2H_3)_2]_2NCH_2CH_2N[(C_2H_3OH)_2CH_3]_2$     (X)

"LA–475"

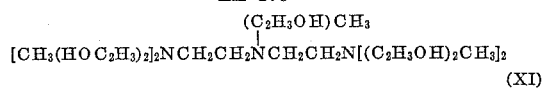

$$[CH_3(HOC_2H_3)_2]_2NCH_2CH_2\overset{(C_2H_3OH)CH_3}{N}CH_2CH_2N[(C_2H_3OH)_2CH_3]_2$$ (XI)

It will be appreciated that the foregoing compounds (X) and (XI) are indicated as being tetra-ols and penta-ols; and it will further be appreciated that linkages of the ether type through the hydroxy groups can be formed to make polymers of these materials above indicated while still having molecules containing more than 2 hydroxy groups therein; but a common and obviously distinguishable property of the foregoing materials is that the materials necessarily have relatively close spacing between the amino nitrogen and the hydroxy groups (of probably $C_2$), or in the case of polyethers formed here from the spacing between the ether O and the active OH is again relatively close in that it is probably about a $C_2$ linkage. Moreover, the instant compounds (X) and (XI) do not have any long chain $C_8$–$C_{22}$ aliphatic hydrocarbon grouping therein, which is a known characteristic of the polyols (1) of the instant invention. In addition, the polyols (1) of the instant invention are so formed that at least the initial tertiary amine group attached to the long chain aliphatic group is spaced from the hydroxy groups by a rather substantial linkage, which comprises, as a minimum, a $C_3$–$C_4$ alkylene-N—$C_2$ alkylene linkage, as these linkages are generally understood. This different spacial arrangement plus the presence of a long chain aliphatic group in the polyols (1) of the instant invention is apparently of critical significance in the practice of the invention.

It should also be noted that the polyols (1) of the instant invention are clearly distinguishable from certain known foam stabilizers that are used in detergent formulations and these materials are often referred to as the alkanol fatty acid amides or ethoxylated alkanol fatty acid amides, and are generally understood to have formulations such as the following lauric amides of this type:

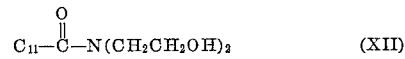

(XII)

(XIII)

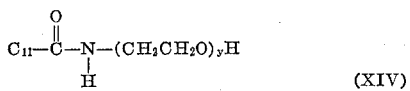

(XIV)

It will be noticed that the foregoing lauric diethanolamide (XII) as well as the other compounds are characterized in that there is a tertiary amide nitrogen linkage as contrasted to a tertiary amine linkage in the compounds of the invention. In this respect, there are definite distinctions and among these would be a characteristic feature indicated in the compound (XIV) wherein a few mols of ethylene oxide are indicated as probably reacting to form an ethoxide chain on the amide N, of substantial length, before the second H on the amide N is reacted with ethylene oxide. Typical of the patents showing compositions of this type include Vitale U.S. Patent No. 2,607,740 and many subsequent patents relating to comparable subject matter in respect to light-duty detergents, wherein these materials are indicated as being useful as foam stabilizers. In contrast, it is known that in polyurethane formation the various polyols are reacted with polyisocyanates in reactions catalyzed by tertiary amines, separately added; whereas the polyols (1) of the instant invention greatly facilitate the instant polyurethane reaction by incorporating within their own molecular structure the particular tertiary amine structure hereinbefore discussed in detail.

It will thus be seen that in the practice of the instant invention the polyol (1) is a new substance and its use in otherwise conventional polyurethane reactions to produce polyurethane resins is novel giving novel results in the resins and/or foams thus produced. As previously mentioned, the polyisocyanates employed and the general theory of reaction between polyol and polyisocyanate is relatively fundamental. A wide variety of polyisocyanates or polyisothiocyanates, or mixtures thereof, may be used in the preparation of the urethanes of the present invention. Representative of such polyisocyanates are: methylene bis-(4-phenyl isocyanate), toluene-2,4-diisocyanate, toluene-2,6-diisocyanate, 1,5-naphthalene diisocyanate, p-phenylene diisocyanate, 3,3'-dimethyl - 4,4' - diphenyl-methane diisocyanate, 4,4'-diphenyl-isopropylidine diisocyanate, 3,3'-dimethyl-4,4'-diphenyl diisocyanate, hexamethylene diisocyanate, ethylene diisocyanate, butylene diisocyanate, cyclopentylene - 1,3 - diisocyanate, cyclohexylene-1,4-diisocyanate, hexamethylene diisothiocyanate, ethylene diisothiocyanate, p-phenylene diisothiocyanate, benzene-1,2,4-triisothiocyanate and the like, or the longer chain polyisocyanates such as those based on polymeric fatty acid radicals.

The polyisocyanates may be represented by the general formula $$R'''[-NCO]_y$$

where R''' is selected from the group consisting of polyvalent aliphatic hydrocarbon radicals having from 2 to about 40 carbon atoms polyvalent alicyclic hydrocarbon radicals having from about 5 to 20 carbon atoms, polyvalent aromatic hydrocarbon radicals having from 6 to about 10 carbon atoms, polyvalent aralkyl radicals having from 7 to about 24 carbon atoms, and y is an integer of 2 to about 4. The corresponding polyisothiocyanates can also be employed.

The reaction of polyols with polyisocyanates to give polyurethane coatings can be represented by the following broad hypothetical formula

HO—A—OH + OCN—B—NCO ⟶

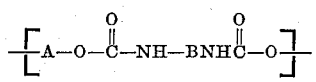

where A and B are the organic radical backbones of these hypothetical compounds.

I claim as my invention:

1. A polyurethane produced by contacting (1) a polyol compound having the following formula:

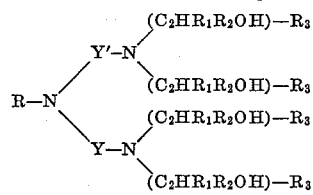

wherein R is an aliphtic $C_8$–$C_{22}$ fatty hydrocarbon chain, Y and Y' are each $C_3$–$C_4$ alkylene groups, $R_1$ and $R_2$ are each selected from the group consisting of H and $C_1$–$C_4$ alkyl groups, $R_1$ and $R_2$ being attached to different C's with the parentheses containing the same in said formula, and $R_3$ is selected from the group consisting of H, alkaryl, aryl, aralkyl and aryloxy groups; and (2) an organic polyisocyanate; the weight ratio of (1):(2) ranging from substantially 5:1 to 1:5; said polyisocyanate consisting essentially of polyisocyanates having the formula:

R'''[—NCO]$_y$ where R''' is selected from the group consisting of polyvalent aliphatic hydrocarbon radicals having from 2 to about 40 carbon atoms, polyvalent alicyclic hydrocarbon radicals having from about 5 to 20 carbon atoms, polyvalent aromatic hydrocarbon radicals having from 6 to about 10 carbon atoms, polyvalent aralkyl radicals having from 7 to about 24 carbon atoms, and y is an integer of 2 to about 4.

2. The polyurethane of claim 1 wherein the polyol compound (1) is tetrakis-N',N',N'',N''-(hydroxypropyl) N,N-bis-(3-aminopropyl) lauryl amine and (2) is diphenyl methane diisocyanate.

3. A cured, insoluble, infusible polyurethane film formed by filming and curing a mixture of (1) a polyol compound having the following formula:

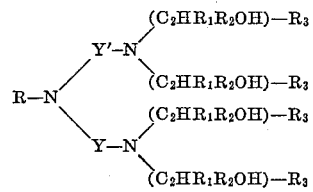

wherein R is an aliphatic $C_8$–$C_{22}$ fatty hydrocarbon chain, Y and Y' are each $C_3$–$C_4$ alkylene groups, $R_1$ and $R_2$ are each selected from the group consisting of H and $C_1$–$C_4$ alkyl groups, $R_1$ and $R_2$ being attached to different C's with the parentheses containing the same in said formula, and $R_3$ is selected from the group consisting of H, alkaryl, aryl, aralkyl and aryloxy groups; and (2) an organic polyisocyanate; the weight ratio of (1):(2) ranging from substantially 5:1 to 1:5, wherein the NCO/OH ratio is substantially within the range of 1:1.1 to 1.2:1; said polyisocyanate consisting essentially of polyisocyanates having the formula:

R'''[—NCO]$_y$ where R''' is selected from the group consisting of polyvalent aliphatic hydrocarbon radicals having from 2 to about 40 carbon atoms, polyvalent alicyclic hydrocarbon radicals having from about 5 to 20 carbon atoms, polyvalent aromatic hydrocarbon radicals having from 6 to about 10 carbon atoms, polyvalent aralkyl radicals having from 7 to about 24 carbon atoms, and y is an integer of 2 to about 4.

4. The film of claim 3 wherein the polyol compound (1) is tetrakis-N',N',N'',N''-(hydroxypropyl)-N,N-bis-(3-aminopropyl) tallow amine and (2) is toluenediisocyanate.

5. A polyurethane foam produced by contacting, in the presence of a polyurethane foaming agent (1) a polyol compound having the following formula:

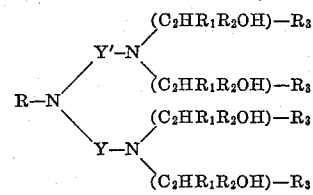

wherein R is an aliphatic $C_8$–$C_{22}$ fatty hydrocarbon chain, Y and Y' are each $C_3$–$C_4$ alkylene groups, $R_1$ and $R_2$ are each selected from the group consisting of H and $C_1$–$C_4$ alkyl groups, $R_1$ and $R_2$ being attached to different C's with the parentheses containing the same in said formula, and $R_3$ is selected from the group consisting of H, alkaryl, aryl, aralkyl and aryloxy groups; and (2) an organic polyisocyanate; the weight ratio of (1):(2) ranging from substantially 5:1 to 1:5; said polyisocyanate consisting essentially of polyisocyanates having the formula:

R'''[—NCO]$_y$ where R''' is selected from the group consisting of polyvalent aliphatic hydrocarbon radicals having from 2 to about 40 carbon atoms, polyvalent alicyclic hydrocarbon radicals having from about 5 to 20 carbon atoms, polyvalent aromatic hydrocarbon radicals having from 6 to about 10 carbon atoms, polyvalent aralkyl radicals having from 7 to about 24 carbon atoms, and y is an integer of 2 to about 4.

6. A polyurethane foam produced by containing, in the presence of a polyurethane foaming agent (1) as a new substance, a polyol compound having the following formula:

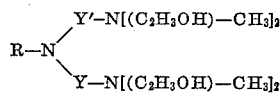

wherein R is an aliphatic $C_8$–$C_{22}$ fatty hydrocarbon chain, Y and Y' are each $C_3$–$C_4$ alkylene groups; and (2) an organic polyisocyanate; the weight ratio of (1):(2) ranging from substantially 5:1 to 1:5; said polyisocyanate consisting essentially of polyisocyanates having the formula:

R'''[—NCO]$_y$ where R''' is selected from the group consisting of polyvalent aliphatic hydrocarbon radicals having from 2 to about 40 carbon atoms, polyvalent alicyclic hydrocarbon radicals having from about 5 to 20 carbon atoms, polyvalent aromatic hydrocarbon radicals having from 6 to about 10 carbon atoms, polyvalent aralkyl radicals having from 7 to about 24 carbon atoms, and y is an integer of 2 to about 4.

7. A polyurethane foam produced by contacting, in the presence of a polyurethane foaming agent (1) tetrakis - N',N',N'',N''-(hydroxypropyl)-N,N - bis-(3-aminopropyl) lauryl amine; and (2) an organic polyisocyanate;

the weight ratio of (1):(2) ranging from substantially 5:1 to 1:5; said polyisocyanate consisting essentially of polyisocyanates having the formula:

$$R'''[-NCO]_y$$

where R''' is selected from the group consisting of polyvalent aliphatic hydrocarbon radicals having from 2 to about 40 carbon atoms, polyvalent alicyclic hydrocarbon radicals having from about 5 to 20 carbon atoms, polyvalent aromatic hydrocarbon radicals having from 6 to about 10 carbon atoms, polyvalent aralkyl radicals having from 7 to about 24 carbon atoms, and $y$ is an integer of 2 to about 4.

8. A polyurethane foam produced by contacting, in the presence of a polyurethane foaming agent (1) tetrakis-N',N',N'',N'' - (hydroxypropyl) - N,N - bis-(3-aminopropyl) tallow amine; and (2) an organic polyisocyanate; the weight ratio of (1):(2) ranging from substantially 5:1 to 1:5; said polyisocyanate consisting essentially of polyisocyanates having the formula:

$$R'''[-NCO]_y$$

where R''' is selected from the group consisting of polyvalent aliphatic hydrocarbon radicals having from 2 to about 40 carbon atoms, polyvalent alicyclic hydrocarbon radicals having from about 5 to 20 carbon atoms, polyvalent aromatic hydrocarbon radicals having from 6 to about 10 carbon atoms, polyvalent aralkyl radicals having from 7 to about 24 carbon atoms, and $y$ is an integer of 2 to about 4.

References Cited

UNITED STATES PATENTS

| | | | |
|---|---|---|---|
| 2,956,031 | 10/1960 | Khawam | 260—77.5 |
| 3,075,927 | 1/1963 | Lanham | 260—2.5 |
| 3,075,928 | 1/1963 | Lanham | 260—2.5 |
| 3,121,748 | 2/1964 | Gey et al. | 260—584 |
| 3,155,728 | 11/1964 | Lesesne | 260—584 |
| 3,200,155 | 8/1965 | Kirkpatrick et al. | 260—77.5 |
| 3,255,253 | 6/1966 | Kuryla | 260—77.5 |

DONALD E. CZAJA, *Primary Examiner.*

LEON J. BERCOVITZ, *Examiner.*

J. J. KLOCKO, R. W. RAUCHFUSS,
*Assistant Examiners.*